(12) United States Patent
Kaukler (10) Patent No.: US 10,260,171 B1
(45) Date of Patent: Apr. 16, 2019

(54) METHODS FOR MAKING CARBON FIBERS FOR HIGH TEMPERATURE APPLICATIONS

(71) Applicant: William Felix Kaukler, Huntsville, AL (US)

(72) Inventor: William Felix Kaukler, Huntsville, AL (US)

(73) Assignee: The Board of Trustees of the University of Alabama, For and on behalf of The University of Alabama in Huntsville, Huntsville, AL (US)

( * ) Notice: Subject to any disclaimer, the term of this patent is extended or adjusted under 35 U.S.C. 154(b) by 90 days.

(21) Appl. No.: 15/408,183

(22) Filed: Jan. 17, 2017

Related U.S. Application Data (63) Continuation-in-part of application No. 14/498,754, filed on Sep. 26, 2014, now Pat. No. 9,695,525.

(60) Provisional application No. 61/883,012, filed on Sep. 26, 2013.

(51) Int. Cl.
| | |
|---|---|
| *D01D 1/10* | (2006.01) |
| *D01D 10/02* | (2006.01) |
| *D01F 2/00* | (2006.01) |
| *D01F 2/02* | (2006.01) |
| *D01F 2/24* | (2006.01) |
| *D01F 2/28* | (2006.01) |
| *D01F 9/16* | (2006.01) |
| *D01D 1/02* | (2006.01) |
| *D01D 5/06* | (2006.01) |
| *D01D 10/06* | (2006.01) |
| *B29C 37/00* | (2006.01) |

(52) U.S. Cl.
CPC .............. *D01F 9/16* (2013.01); *B29C 37/006* (2013.01); *D01D 1/02* (2013.01); *D01D 1/103* (2013.01); *D01D 5/06* (2013.01); *D01D 10/06* (2013.01); *D10B 2505/12* (2013.01)

(58) Field of Classification Search
CPC .......... B29C 37/006; D01D 1/02; D01D 1/10; D01D 1/103; D01D 5/06; D01D 10/02; D01D 10/06; D01F 2/00; D01F 2/02; D01F 2/24; D01F 2/28; D01F 9/16
USPC .......... 264/29.2, 29.7, 101, 102, 178 F, 187, 264/188, 189, 203, 211.15, 211.16, 232, 264/233; 423/447.1, 447.4, 447.8
See application file for complete search history.

(56) References Cited

U.S. PATENT DOCUMENTS

| | | |
|---|---|---|
| 2009/0227975 A1 | 9/2009 | Dougherty, Jr. |
| 2010/0256352 A1 | 10/2010 | Uerdingen |
| 2014/0194603 A1 | 7/2014 | Lehmann |

OTHER PUBLICATIONS

Kaukler, U.S. Appl. No. 14/498,754, entitled, "Methods and Systems for Making Carbon Fibers for High Temperature Applications," filed Sep. 26, 2014.

*Primary Examiner* — Leo B Tentoni
(74) *Attorney, Agent, or Firm* — Maynard Cooper & Gale, P.C.; Jon E. Holland (57) ABSTRACT

The present invention relates to a method for the continuous production of low thermal conductivity endless filament yarns with a compact, homogeneous structural morphology. The presently disclosed methods utilize safe and recyclable ionic liquids to produce carbon fiber precursors from cellulose. The fibers are produced by the carbonization of cellulose carbon fiber precursors. The precursor fiber filaments have an increased tear resistance with simultaneously sufficient elongation, a round or crenulated cross-section, and homogeneous fiber morphology. The filament yarns exhibit performance characteristics similar to those produced from traditional viscose rayon. The resulting fibers are especially suited for aerospace applications in composite materials used at the limits of high temperatures, for instance in structures found in rocket nozzles or atmospheric reentry heat shields on spacecraft.

23 Claims, 5 Drawing Sheets

METHODS FOR MAKING CARBON FIBERS FOR HIGH TEMPERATURE APPLICATIONS

CROSS REFERENCE TO RELATED APPLICATIONS

This application is a continuation-in-part of U.S. Pat. No. 9,695,525, entitled "Methods and Systems for Making Carbon Fibers for High Temperature Applications" and filed on Sep. 26, 2014, which is incorporated herein by reference. U.S. Pat. No. 9,695,525 claims priority to U.S. Provisional Patent Application No. 61/883,012, entitled "Carbonization of Rayon Fibers for a Heat Shield" and filed on Sep. 26, 2013, which is incorporated herein by reference.

STATEMENT REGARDING FEDERALLY SPONSORED RESEARCH OR DEVELOPMENT

This invention was made with Government support under W31P4Q-10-D-0092 awarded by the Department of Defense. The Government has certain rights in the invention.

RELATED ART

A thermal soak heat shield is a device which absorbs and radiates heat away from a spacecraft structure. Generally, this type of heat shield utilizes ceramic or composite tiles located over the vehicle surface. Reinforced carbon fiber material is placed on the highest heat load points, for instance the nose leading edges or the rocket nozzle of the space shuttle. Traditionally, the carbon fibers are constructed from a viscose rayon precursor. Cellulosic fibers, such as rayon, may be pyrolysed into an amorphous carbon structured fiber useful in the construction of heat shields. The low thermal conductivity of the cellulosic carbon fiber makes it an excellent candidate for thermal protection systems. When used as the reinforcing fiber in rocket nozzle construction, cellulosic precursor carbon fibers offer the lowest recession rates. Differences in the method of producing such fibers, however, such as the rate of heating and washing of the fibers, can lead to significant differences in the suitability of the resulting fibers for thermal protection systems.

A traditional method of manufacturing viscose rayon suitable for heat loads involves the use of caustic chemicals. This method utilizes wood (cellulose and lignin) as a source of cellulose and results in the production of toxic waste products, such as carbon disulfide, lignin and the xanthates. The Environmental Protection Agency implemented regulations which make the production of viscose rayon cost prohibitive. As a result, such viscose rayon is no longer commercially produced in the United States. NASA and the Department of Defense stockpiled millions of pounds of such viscose rayon for rocket nozzle construction in the early 1990s in anticipation of these environmental regulations, but these stockpiles are now nearly depleted. As a result, new methods for producing fibers with equivalent thermal performance are desired.

SUMMARY OF INVENTION

In one embodiment, the present disclosure relates to a method of preparing carbon fiber, comprising: mixing cellulose with an ionic fluid for at least one hour to create an ionic fluid admixture; degassing the admixture; spinning the admixture into ionic liquid (IL) rayon fibers; drying the IL rayon fibers; washing the IL rayon fibers; and carbonizing the IL rayon fibers. In certain embodiments, the carbonizing comprises the steps of: increasing the temperature of the IL rayon fibers from about room temperature to a first temperature of about 250° C.; and increasing the temperature of the IL rayon fibers from the first temperature to a second temperature between 1000° C. and 1200° C. In certain embodiments, the temperature of the IL rayon fibers is increased from about room temperature to the first temperature of about 250° C. over a period of about no more than 48 hours. In certain embodiments, the temperature of the IL rayon fibers is increased from the first temperature to the second temperature between 1000° C. and 1200° C. over a period of about no more than 24 hours.

In certain embodiments, the carbonizing step of the method of preparing carbon fiber further comprises the step of maintaining the second temperature for approximately one hour. In certain embodiments, the carbonizing further comprises the step of decreasing the temperature of the IL rayon fibers from the second temperature to about room temperature over a period of about 24 hours. In certain embodiments, the method of preparing carbon fiber further comprises the step of washing the carbonized IL rayon fibers using purified water. In certain embodiments, the mixing continues until the cellulose is dissolved in the ionic fluid. In certain embodiments, the mixing and degassing are performed at temperatures below 105° C. In certain embodiments, the spinning is performed at a temperature of at least 35° C. In certain embodiments, the spinning is performed at a temperature of about 50° C. In certain embodiments, the concentration of cellulose in the admixture is between 2.4% and 8% w/v. In certain embodiments, the ionic liquid comprises 1-ethyl 3-methylimidazolium acetate. In certain embodiments, the 1-ethyl 3-methylimidazolium acetate has a purity of at least 90%. In certain embodiments, the mixing is performed in an ionic liquid comprising 20% w/v acetone. In certain embodiments, mixing is performed in an ionic liquid comprising 20% w/v methanol. In certain embodiments, the degassing is performed under vacuum. In certain embodiments, the spinning occurs in a coagulant bath comprising methanol. In certain embodiments, the IL rayon fiber produced by the spinning remains in the coagulant bath for at least one minute. In certain embodiments, washing the IL rayon fibers comprises washing the IL rayon fibers in water until substantially all of the IL is removed. In certain embodiments, the mixed cellulose comprises cotton linters with a degree of polymerization of at least 1000. In certain embodiments, the mixed cellulose comprises bleached wood pulp with a degree of polymerization of at least 1000.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure relates to methods and systems for the continuous production of cellulosic filament yarns with a compact, homogeneous structural morphology, and the low thermal conductivity carbon fibers produced by these methods. The disclosed methods utilize safe and recyclable ionic liquids (IL) to produce carbon fiber precursors from cellulose. In one embodiment, the fibers are produced by the carbonization of cellulose carbon fiber precursors. The fibers are manufactured from cellulose solutions in ionic fluids as part of a wet spinning process. The processing of the cellulose at near room temperature preserves the necessary degree of polymerization. The precursor fiber filaments have an increased tear resistance with simultaneously sufficient elongation, a round or crenulated cross-section, and homogeneous fiber morphology. The filament yarns exhibit performance characteristics similar to those produced from traditional viscose rayon. The resulting carbon fibers are especially suited for aerospace applications in composite materials used at high temperatures, for instance in structures found in rocket nozzles or atmospheric reentry heat shields on spacecraft.

Figure 1:
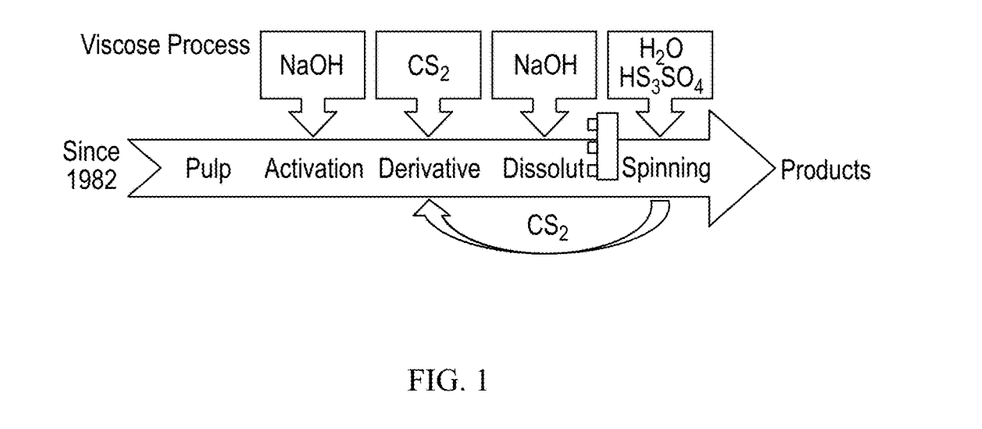
FIG. 1 is an illustration of a method of producing carbon fibers using a viscose rayon precursor.

A traditional method of producing viscose rayon precursor fibers is illustrated in FIG. 1. This process includes the use of high concentrations of toxic chemicals such as sodium hydroxide, carbon disulfide and sulfuric acid. These chemicals produce large quantities of toxic byproducts which can contaminate the water supply and are harmful to humans.

In contrast, the methods of this disclosure avoid the use of harmful chemicals and instead include dissolving the cellulose in an ionic liquid (IL). Cellulose, an organic compound with the formula $(C_6H_{10}O_5)_n$, is a polysaccharide consisting of a linear chain of several hundred to many thousands of β(1→4) linked D-glucose units. Cellulose is an important structural component of the primary cell wall of green plants and many forms of algae. With respect to the production of filament or textile yarns described in the present disclosure, the source of cellulose may be, for example, cotton, linen, and/or other plant fibers. In one embodiment, the cellulose is cotton linters (from the base of the cotton ball). Other sources of cellulose are possible in other embodiments. In one embodiment, the cellulose is in powder form.

Ionic liquids are strong solvents, have high decomposition temperatures and have very low volatility. The ionic liquids described herein are organic compounds that may be referred to herein as "room temperature ionic liquids". One example of a room temperature ionic liquid is 1-butyl 3-methylimidazolium chloride (Bmim Cl). This fluid has a melting point of only 65° C. and is a liquid at room temperature. The Bmim ion is large and this causes the delocalization of the electrostatic charges and thus weakens the ionic bond strength of the solution, which lowers the melting point. In an additional embodiment, the ionic liquid comprises 1-ethyl 3-methylimidazolium acetate (Emim OAc) with at least 90% purity.

Figure 2:
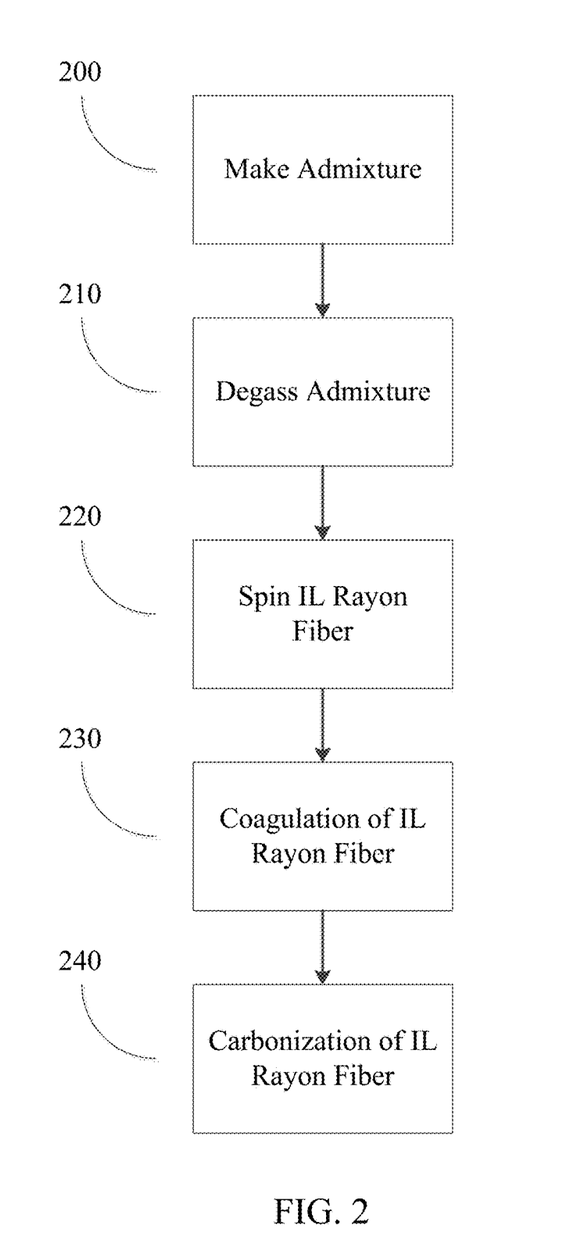
FIG. 2 shows a flowchart of an exemplary method for producing carbon fibers for high temperature applications.

FIG. 2 shows an exemplary flowchart of a method for producing carbon fiber filaments for use in high temperature applications. In block 200, the cellulose is dissolved in the ionic liquid, producing a solution hereinafter referred to as an "admixture". Traditionally, methods of dissolving high concentrations of cellulose in a solution require the use of caustic chemicals, high temperature, and high pressure. The caustic chemicals cause derivatization of the cellulose and a concurrent detrimental reduction of the molecular weight of the polymerized cellulose molecules. The ionic liquids of the present disclosure dissolve the cellulose material with little or no derivatization, thus preserving the high molecular weight of the polymer and providing increased strength of the resulting cellulosic rayon fibers.

In one embodiment, the cellulose feed stock comprises cotton linters that comprise nearly pure cellulose with a degree of polymerization (DP) exceeding 1000. In another embodiment, bleached wood pulp with a DP exceeding 1000 may be used as the cellulose feed stock. As used herein, DP means the average number of monomeric units per macromolecule. The resulting admixture contains between 2.4 and 8% w/v cellulose. Other concentrations of cellulose are possible in other embodiments. In an additional embodiment, the admixture contains 5% w/v cellulose, which provides a solution with an advantageous balance of viscosity, mixability and fiber strength. In an exemplary embodiment, the ionic liquid comprises Emim Oac with a minimum purity of 90%. Any impurities present in the ionic liquid have little affinity for the cellulose and are removed from the admixture during any subsequent wash steps. The solubility of the cellulose and the solution properties can be controlled by the ionic liquid constituents.

Referring again to block 200 of FIG. 2, this step comprises admixing the cellulose with a suitable hydrophilic ionic liquid and agitating to form a solution. In one embodiment, the admixture is heated to a temperature from between 50° C. to 100° C. to increase the dissolution rate and reduce the viscosity, although other temperature ranges may be possible in other embodiments. In one embodiment, a temporary increase of the heating temperature to 120° C. may aid in mixing. A temporary increase in the temperature of the solution aids the stirring motion to introduce adequate shear to break up the cellulose clumps and ensure contact between the cellulose particles and the liquid. In addition, the elevated temperatures prevent adsorption of moisture from the air. Trapped air spaces between the fibers allow atmospheric moisture to enter the solution. In one embodiment, a motorized stirring paddle may be employed wherein the paddle imparts enough shear force to enhance dissolution.

In one embodiment, the temperature of the cellulose ionic liquid solution is maintained at a specified range during the mixing process. This may be accomplished, for example, with a heating blanket, oil bath or periodic pulsed heating in a microwave oven. In one exemplary embodiment, the heated admixture is mixed for a minimum of one hour, where it is then transferred to a vacuum oven with a temperature from between 85° C. to 105° C., although other temperature ranges may be possible in other embodiments. In one embodiment, a temporary increase of the heating temperature to 120° C. may aid in mixing. The ionic liquid absorbs microwaves well, allowing mixing times to be reduced to less than an hour. Microwave energy enhances the dissolution rate by 2-10×, not only because of the temperature rise, but also because of the improved kinetics from molecular motion on the molecular scale.

In this exemplary embodiment, it is critical that the temperature of the admixture not exceed approximately 200° C. as this will cause burning of the cellulose. The use of a microwave oven requires close monitoring of the solution temperature as thin films of solution can form on the walls of the vessel container. Overheating may cause deterioration of the cellulose, also referred to as derivatization or decomposition. Detrimental derivatization occurs in two situations: (1) decomposition of the cellulose molecules to form glucose molecules, as evidenced by the appearance of a caramel color and an odor of burning paper or sugar; and (2) the reduction of the cellulose molecular weight (without decomposing the cellulose molecules to non-cellulose components like glucose) from approximately 1000-3000 DP to approximately 200-300 DP. The strength of the rayon fiber is a result of the high molecular weight of the cellulose polymer. In one embodiment, the temperature of the vessel is maintained below 105° C. to avoid derivatization of the ionic liquid. The ionic liquids of the present disclosure will not cause derivatization for at least three months after creation of the admixture. In one embodiment, the cellulose feedstock is added to the ionic liquid gradually and stirring continues until the resulting solution is completely clear. Any undissolved cellulose particles will interfere with the production of the carbon fibers.

Referring again to FIG. 2, the ionic liquid/cellulose mixture is degassed and stored, as indicated at block 210. In this embodiment, the admixture solution is placed into a standard vacuum oven where it is degassed and then stored to ensure full dissolution. The degassing may be performed under vacuum at about room temperature up to 100° C. overnight. If stored in the vacuum oven for longer times, the temperature should be no more than 85° C. to prevent slow degradation of the solution. Where acetone and/or methanol are used as co-solvents, this vacuum treatment should be performed before such co-solvents are added to avoid the undoing of the volatile addition. The storage is conducted at temperatures from between 85° C. and 95° C. for at least two days. Other temperature ranges may be possible in other embodiments. In addition, the length of storage may differ in other embodiments. Storage in these conditions allows for the removal of all traces of water. The solution may be examined to ensure that there are no in undissolved cellulose particles. This examination may be performed, for instance, with a microscope. Even microscopically sized cellulose particles will affect the performance of the precursor rayon fiber and, ultimately, the final carbon fiber.

Block 220 of FIG. 2 represents the step of spinning the cellulosic precursor fibers to form a rayon fiber, referred herein as "IL rayon". The spinning process as described in this embodiment is normally referred to as wet spinning as the spinneret extrudes the cellulose solution directly into a methanol coagulant bath. The spinneret may be constructed from a metal disk, for instance a stainless steel disk, with precisely formed microscopic holes. Spinnerets may include 10 holes of approximately 125 micrometer diameter, 100 holes of approximately 70 micrometers, and 500 holes of approximately 65 micrometers, although different numbers of holes with other diameters are possible in other embodiments. As a result of using the spinnerets, multiple IL rayon fibers are spun in parallel, each exhibiting similar chemical properties.

Figure 5:
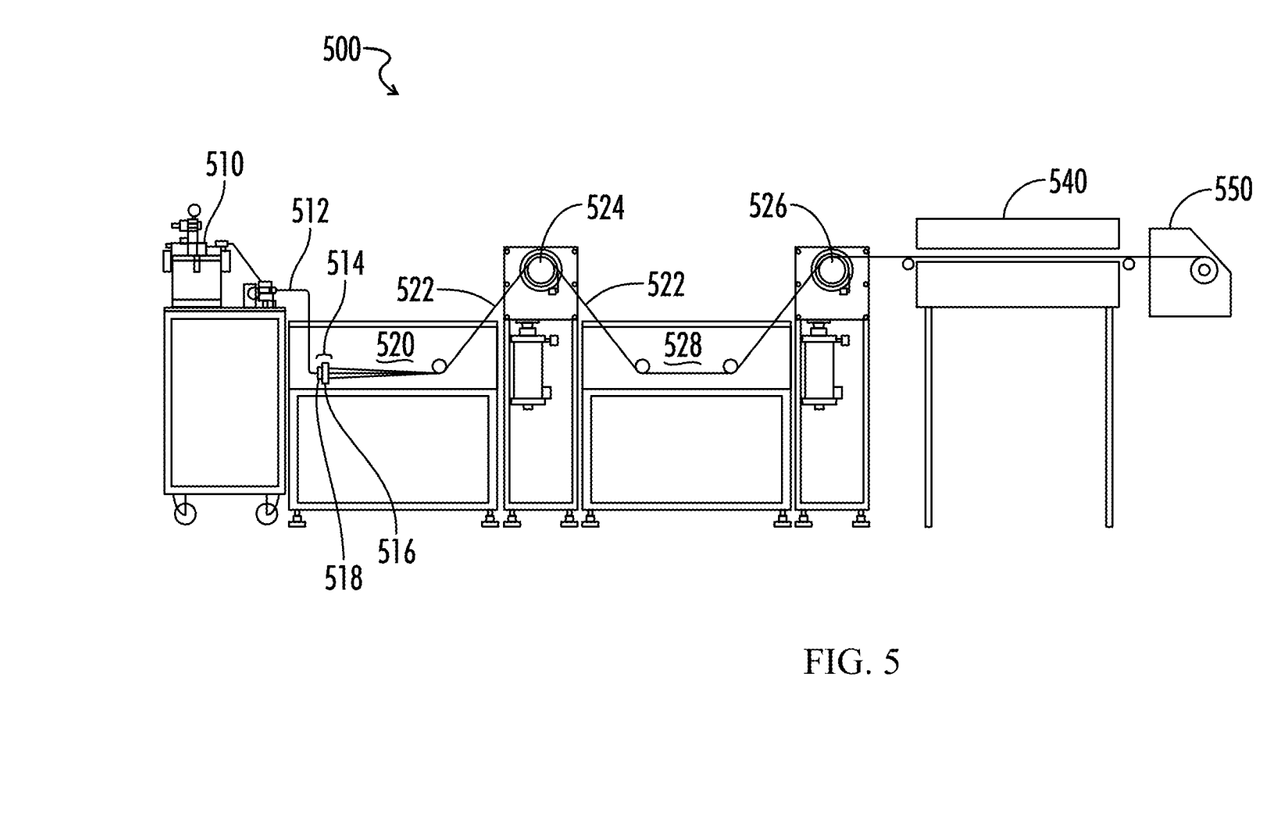
FIG. 5 is a diagram illustrating a fiber spinning machine with a wash bath.

FIG. 5 illustrates an exemplary spinning apparatus 500 utilized in creating the IL rayon fibers produced by the methods of the present disclosure. A pressure vessel 510 contains compressed gas which forces the pre-heated admixture from an open container of about one liter (not shown) out through a feed tube 512 at a pressure between about 100 psi and 200 psi, although other pressure ranges may be possible in other embodiments. The feed tube 512 optionally leads directly to the spin die 514 or a spinneret 516 mounted in the spin die 514. A micron pore filter 518 is mounted within the spin die 514 to ensure the particles in the admixture do not plug the holes in the spinneret 516. This is especially important when spinning a large number of fibers. The pressure behind the admixture establishes the extrusion rate which is also approximately the pull rate. The pressure needs to be adjusted (and monitored) during spinning, particularly when the filter 518 becomes plugged, to maintain consistent fiber extrusion rates.

The spin die 514 is submerged in a methanol coagulant bath 520 where the fibers 522 emerge, and removal of the ionic liquid by diffusion begins. The admixture is extruded under pressure through the holes into a coagulant bath 520 as continuous, smooth streams of viscous fluid. The admixture enters the coagulant bath 520 which displaces the ionic liquid, causing the extruded fibers 522 to shrink in volume as the concentration of the cellulose increases. Displacement of the ionic liquid occurs, because the coagulant has a higher chemical affinity for the ionic liquid than for the cellulose. The process of removing the ionic liquid from the fiber 522 is affected by the kinetics of diffusion, where the coagulant diffuses into the cellulose fiber 522 while the ionic liquid diffuses out of the fiber 522 radially. In this embodiment, the fiber diameter and the cellulose concentration within the admixture play a key role in the diffusion rate. In one embodiment, the liquid in the coagulant bath 520 is maintained at a temperature between about 35° C. and 60° C., although other temperature ranges may be possible in other embodiments. The residence time of the freshly spun fiber 522 in the coagulant bath 520 should be no less than 1 minute, with 2 minutes and higher preferred.

The IL rayon fiber 522 has a tendency to adhere to other adjacent fibers, regardless of the extrusion pressure and extrusion speed. The use of methanol prevents the IL rayon fibers 522 from sticking and allows for the simultaneous production of multiple fibers in what is known in the art as a "tow". Sticking fibers at the rayon stage of production makes carbonization ineffective for production of material used in high temperature applications.

Referring again to FIG. 5, the fiber bundle 522 is pulled through the coagulant bath 520 by the first godet roller 524 spinning at a rate between 1 and 5 m/min. Optionally, the spun IL rayon fibers may then be washed in one or more separate methanol wash baths to remove additional ionic liquid, provided that there is no opportunity for the fiber 522 to completely dry during the transfer to the wash bath. For example, as shown in FIG. 5, the fibers 522 are draped over the first godet roller 524 and travel into a methanol wash bath 528 at a temperature between approximately 35° C. and 60° C., although other temperature ranges may be possible in other embodiments.

With reference to FIG. 5, the fibers 522 are then draped over the second godet roller 526 after the wash bath 528 such that the speed of the second roller 526 is equal or higher than the first roller 524. In one embodiment, the speed of the second godet 526 is up to 25% faster than the speed of the first godet 524. This difference in speed maintains the fibers 522 in a tight formation and also slightly stretches the fibers 522, aiding in solvent removal.

In the embodiment illustrated in FIG. 2, the volume of the IL rayon fiber decreases as ionic liquid is removed from the fiber. For example, an IL rayon fiber produced from an admixture with a 5% cellulose concentration will exhibit an approximate 50% reduction in fiber diameter after coagulation and washing. The final diameter of the fiber is approximately one-third (⅓) the starting orifice diameter after the fiber is dried. An admixture with a 2.4% cellulose concentration will result in a greater reduction in fiber volume.

Referring again to FIG. 5, the fibers 522 then enter a dryer unit 540 after exiting the final wash bath. The dryer unit 540 propels air heated to approximately 80° C. in a laminar fashion upwards as the fibers 522 pass. In one embodiment, auxiliary fans (not shown) may be used to further dry the fibers 522 before spooling. A spooler 550 acts to individually spool each fiber 522 of up to a ten fiber bundle so that performance testing and property measurements may be completed on single fibers. The speed of the spooler 550 may be adjusted so that it equals the speed of the second godet 526, thus preventing breakage of the fibers 522.

The rapid hardening of the fibers 522 produced with methanol coagulant bath 520 make drying very rapid and offer the advantage that full washing of ionic liquid from the fibers 522 before drying is not required. Full washing of the fibers 522, wherein substantially all of the IL is removed, can be postponed to a later time with hardened fibers prior to carbonization using ordinary water and longer soaking times. As used herein, "substantially all" means at least 95%, but preferably at least 98%. Methanol coagulation followed by drying even with some entrained ionic liquid produces fibers that do not stick together as much as fibers extensively washed with water, which is contrary to the current paradigm requiring prolonged washing in water. This new observation allows leisurely washing after the first drying and spooling of the fibers 522, allowing extraction of the residual ionic liquid at a later time. Furthermore, this leisurely washing, by allowing extended washing times, offers the ability to purify the fibers further and reduce impurities known in the art, that cause plasmas to form during service of the fibers in a rocket nozzle that increase recession rates and raise nozzle surface temperatures and create plume signatures. Drying quickly, with methanol coagulant retained in the fibers, enhances the densification of the cellulose molecules within the fiber volume as drying progresses. Once the cellulose molecules are brought into more intimate contact within the fiber and no longer swollen by solvent (whether water or methanol) their local chemical bonding (van der Waals' type) is secured as the fiber becomes denser and stronger, which is not possible with conventional water-based coagulant baths and wash baths.

Figure 3A:
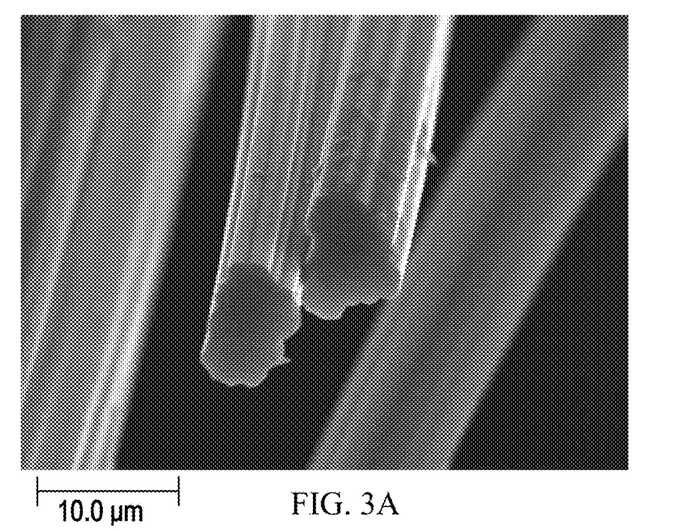
FIG. 3A is an SEM micrograph of viscose rayon illustrating a crenulated cross-section.
Figure 3B:
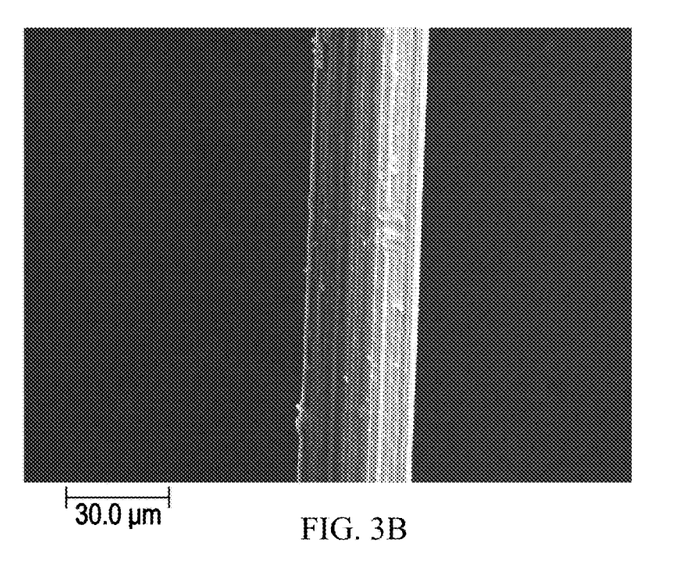
FIG. 3B is an SEM micrograph of ionic liquid processed rayon fiber illustrating moderate crenulation.

In one embodiment, the surface texture of the fibers may be altered by changing the conditions of the spinning process. For example, crenulation results from the rapid radial shrinkage of the fiber during ionic liquid extraction, causing the fiber to partially collapse. The fiber surface may be smooth and or may be moderately crenulated. Viscose rayon fibers were traditionally characterized by strong crenulation. More dilute solutions of cellulose, for example admixtures with a 2.5% cellulose concentration, produce crenulated IL rayon fibers. In contrast, admixtures with a 5% cellulose concentration produce fibers exhibiting a smooth, round in cross section or only a slight degree of crenulation (amounting to longitudinal grooves along the length of the fiber). In this embodiment, the degree of crenulation is controlled by the cellulose concentration and by the spinneret orifice diameter. As an example, FIG. 3A illustrates a scanning electron microscope (SEM) micrograph of commercial viscose rayon showing non-circular cross sections that are described as crenulated. FIG. 3B illustrates a SEM micrograph of ionic liquid processed rayon fiber with moderate crenulation. With respect to FIG. 3B, Bmim Cl was used to prepare an admixture containing a concentration of 1.24% cotton linters. It is advantageous for fibers used in the manufacture of rocket nozzles and other materials used in high temperature applications to exhibit some degree of crenulation as it increases the surface contact between the fiber and the surface of the component. The increased surface contact is believed to raise the strength of the composite by allowing more efficient stress transfer from the weaker matrix to the stronger fiber. These high temperature applications require low conductivity of the carbon fiber to reduce ablative erosion and develop an adherent char layer to insulate the underlying composite from direct heat and radiant heat.

In an additional embodiment, the IL rayon fiber is then converted to carbon fibers with the proper dimensions, stiffness and thermal conductivity. Referring again to FIG. 2, block 240 includes the carbonization of the IL rayon fibers. An embodiment of this carbonization procedure is illustrated in more detail in FIG. 4. The conversion of rayon fibers into carbon fibers is a four phase thermal process: (1) increase from about room temperature to a first temperature over a period of about 48 hours (block 410); increase from the first temperature to a second temperature over a period of about 24 hours (block 420); (3) maintain at the second temperature for about one hour (block 430); and (4) decrease from the second temperature to about room temperature over a period of about 24 hours (block 440).

Figure 4:
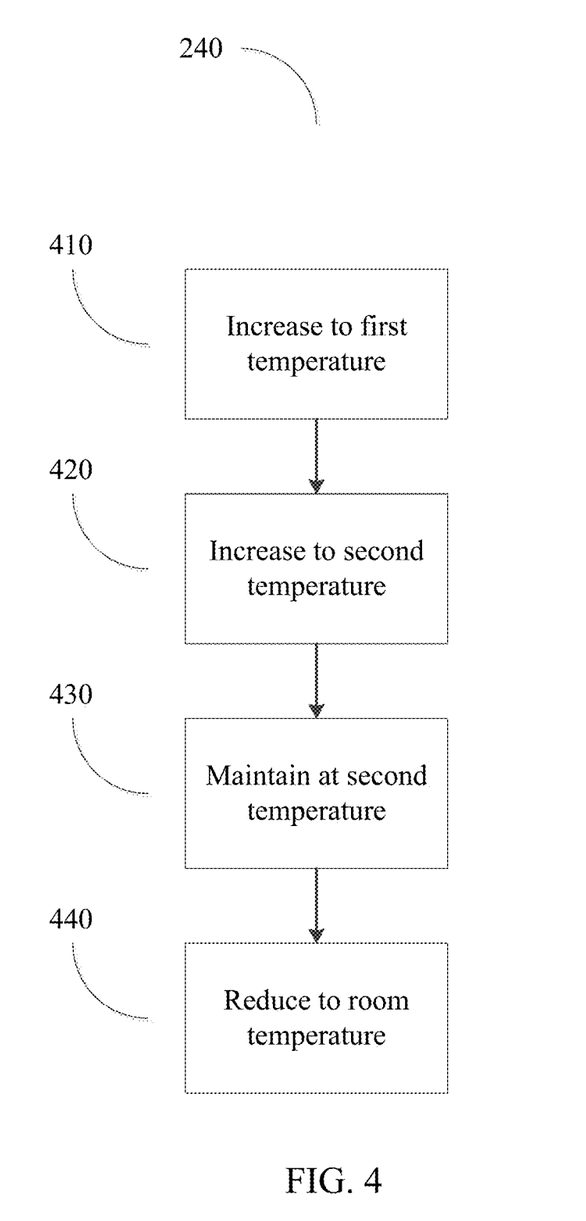
FIG. 4 shows a flow chart of an exemplary method of the carbonization step of FIG. 2.

Referring now to the embodiment illustrated by block 410 of FIG. 4, the increase in temperature is an oxidative process that allows the fiber to retain its shape despite being subjected to temperatures which exceed its melting point. In one embodiment, this step is performed through contact with atmospheric oxygen, although other gases and catalytic agents may be used in other embodiments. The step is exothermal. Heating the fibers at a high rate of speed will cause the release of large amounts of exothermal heat, resulting in a reduction of the carbon yield, adherence of adjacent IL rayon fibers and the introduction of voids into the fibers. In one embodiment, the IL rayon fibers are heated in an insulated furnace that is open to atmospheric air, allowing oxygen to come into contact with the fibers. In this embodiment, the fibers are heated to a temperature of about 250° C. Other temperature ranges may be possible in other embodiments. In addition, the time required to heat the fibers may differ in other embodiments. In one embodiment, the heating rate is approximately 4.68° C. per hour. Such slow heating rates allow oxygen to diffuse into the center of the fiber and thus maintain uniform properties throughout the fiber volume. A heating rate of 0.078° C./min or less is required during the stabilization process to prevent the fiber from melting or disintegrating.

Referring again to box 410 of FIG. 4, absorbed water exits the IL rayon fiber as the temperature exceeds 120° C., causing dehydration and depolymerization. Dehydration continues to 250° C. Removal of the water and methanol before the IL rayon fibers are heated to 250° C. reduces levoglucosan formation and thus improves carbon yield. As a result, such slow stabilization heating rates improve the final carbon fiber product.

The fiber may undergo pyrolysis where it is converted into amorphous carbon, which must be performed under a protective inert gas atmosphere. The furnace atmosphere must be oxygen-free to part per million levels at this step until the cool-down is completed. In one embodiment, the pyrolysis step is performed in a nitrogen atmosphere created from the boil-off gas from liquid nitrogen. The gas is directed to the inside of the furnace where the fiber sits in such a way that no opportunity for air or oxygen (such as from water) can enter. In one embodiment, a silicon oil bubbler may be employed to stop air oxygen from entering the furnace as gasses exit. The exiting gas must flow at a low rate of about 0.5 to about 2 liters per minute to fully expel the pyrolysis gasses. The pressure must be great enough to maintain the flow and prevent oxygen from entering the furnace, for instance a positive pressure of about 2 to about 15 psia. Other pressure ranges may be possible in other embodiments.

In an additional embodiment, the furnace temperature is raised to a maximum of between about 1000° C. and 1200° C. over a period of about 24 hours. Other temperature ranges may be possible in other embodiments. In addition, the time required to heat the fibers may differ in other embodiments. Fibers produced at this temperature range are referred to as "low fired" fibers. In an additional embodiment, the temperature increases at a rate of between about 31.25° C. to 39.5° C. per hour, although the rate may differ in other embodiments. Adjusting the temperature range and heating rate will result in a carbon fiber with slightly different properties, for instance stiffness and thermal conductivity. Heating the fibers at temperatures over 1200° C. results in fibers that are not suitable for some high temperature applications due to the higher graphitization and resulting higher thermal conductivity. High temperature applications require low thermal conductivity with adequate strength. Heat treatment conditions (i.e., time and temperature) may be altered to engineer the desired properties such as greater stiffness (modulus), greater strength and high thermal conductivity.

In an additional embodiment, the interior surface of the furnace may be lined with a substance which acts to absorb free oxygen. In one embodiment, the furnace is lined with Grafoil, a high temperature paper-like sheet produced from flexible graphite flakes. Other types of oxygen-absorbing materials may be used in other embodiments. The oxygen-absorbing material gathers any free oxygen before it before it comes into contact with the fibers, resulting in a significantly greater amount of carbon mass associated with the fibers. Prolonging the processes of stabilization and carbonization or pyrolysis prevents damaging kinking of the carbon fibers and increases fiber yield from about 22% to 35%. Utilization of slow heating rates results in less stress that may cause kinking, uneven rates of shrinkage and lower strength carbon fibers. Preferably, the fiber 522 is positioned flat, to ensure even gas exchange and even heating rates. As used herein, "flat" means about parallel an axis wherein no portion deviates more than 10° from the axis.

Referring now to block 430 of FIG. 4, the fiber may be maintained at the selected second temperature for about 1 hour, although this time period may differ in other embodiments. Referring to block 440 of FIG. 4, the period of holding at the second temperature is followed by a cool down step, where the temperature of the fiber is lowered to room temperature over an approximate 24 hour period, preventing thermal shock of the fiber and of the furnace. In one embodiment, the fiber is cooled at a rate of about 45 degrees per hour. Other temperature rates may be possible in other embodiments. The resulting fiber may be washed with purified water, such as 10 megaohm conductivity water.

In an additional embodiment, the present disclosure pertains to a carbon fiber produced by the methods described herein. The fibers are suitable for high temperature applications, for instance carbon-carbon composite nozzles or phenolic resin-C composite nozzles. In one embodiment, the carbon fiber is manufactured from an IL rayon fiber precursor. These IL rayon carbon fibers have properties similar to those exhibited by fibers produced from viscose rayon (manufactured by North American Rayon Corp., or NARC). Carbon fibers produced using the above described steps are characterized as illustrated in Table 1.

TABLE 1

Properties of carbon fibers produced from IL rayon.

| Parameter | Characterization |
| --- | --- |
| Tensile strength | ~100 ksi; 685 MPa |
| Tensile modulus | ~6 Msi; 41 GPa |
| Thermal conductivity | 3.7 W/m-K |
| Ash content | 0.4 w % |
| Carbon Assay, w % | 96+ |

In an additional embodiment, the carbon fibers produced by the above described methods are characterized by a tensile strength in the range of 310-710 MPa, an elongation at rupture in the range of 0.8-1.5% for 1000° C. fired and 0.7-1.1% for 1100° C. fired carbon fiber, a modulus of elasticity between 25-40 GPa for 1000° C. fired and 30-42 GPa for 1100° C. fired carbon fiber, and a predicted thermal conductivity along the length of the fiber of 3.2-3.5 W/m-K based on fiber electrical resistivity measurements of 38 to 71 μohm-m.

In an additional exemplary embodiment, the present disclosure pertains to a system for producing carbon fiber. In one embodiment, the system includes a pressurized furnace. As described above, the pressurized furnace is utilized in the conversion of cellulose precursors to IL rayon fibers. In this embodiment, the cellulose precursors are used to create an admixture with an ionic liquid, for example 1-ethyl 3-methylimidazolium acetate (Emim OAc).

The system further includes a fiber spinning apparatus comprising a pressurized vessel fluidly connected to a spinneret. The vessel contains compressed gas which forces the admixture from an open container, through a feed tube to a spinneret contained within a spin die. The spin die is submerged in a coagulant bath into which the fibers emerge.

In one embodiment, the system additionally includes at least one methanol wash bath. The fibers are propelled through the coagulant and wash bath by the spinning action of series of godet rollers. In an additional embodiment, the system includes a dryer which propels air heated onto the fibers to aid in the processing. The system may also include a spooler to individually spool each fiber so that performance testing and property measurements may be completed on single fibers.

One advantage of the methodology described herein is that, unlike conventional water wash baths, methanol coagulant baths harden the fiber quickly by creating a harder skin on the fiber surface that helps prevent sticking of the fibers. Further, the rapid hardening of the fiber produced with methanol coagulation make drying very rapid and offer the advantage that full washing of the fiber before drying is not required. Instead, full washing can be postponed to a later time with hardened fibers using ordinary water and longer soaking times. Furthermore, this leisurely washing offers the ability to purify the fibers further, by extending the washing time, and reduce impurities that cause plasmas to form during service in a rocket nozzle that increase recession rates, raise nozzle surface temperatures and create plume signatures.

Another advantage of the methodology described herein is that the processing time requiring heating is only about 4 days (compared to a week or more using other methods), resulting in significant energy savings. Although it is known that the process of carbonization from cellulosic fibers can be sped up significantly, for example a stabilization stage lasting 9-12 hours, such conventional processes render the fibers unsuitable for use in critical flight hardware, such as rocket nozzles, due to their relatively high thermal conductivity. For example, conventional methods require extra care to remove the volatiles released at the high rate is required. Further, conventional methods require extra steps, such as tensilizing the fibers (stretching them or straining them slightly) during pyrolysis to reduce the kinking that occurs with high heating rates, which results in carbon fiber with sufficient strength, but excessive thermal conductivity that is unacceptable for use in critical flight hardware. Conversely, the methods described herein allow both expedited processing while maintaining sufficiently low thermal conductivity.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

The various embodiments of the methods described herein are exemplary. Various other embodiments for the methods described herein are possible.

Now, therefore, the following is claimed:

1. A method of preparing carbon fiber, comprising:
    mixing cellulose with an ionic fluid for at least one hour to create an ionic fluid admixture;
    degassing the admixture;
    spinning the admixture into ionic liquid (IL) rayon fibers;
    drying the IL rayon fibers;
    washing the IL rayon fibers subsequent to the drying; and
    carbonizing the IL rayon fibers.

2. The method of claim 1, wherein the carbonizing further comprises the steps of:
    increasing the temperature of the IL rayon fibers from about room temperature to a first temperature of about 250° C.;
    increasing the temperature of the IL rayon fibers from the first temperature to a second temperature between 1000° C. and 1200° C.; and
    maintaining the second temperature for approximately one hour.

3. The method of claim 1, wherein the carbonizing further comprises the steps of:
    increasing the temperature of the IL rayon fibers from about room temperature to a first temperature of about 250° C.;
    increasing the temperature of the IL rayon fibers from the first temperature to a second temperature between 1000° C. and 1200° C.;
    wherein the temperature of the IL rayon fibers is increased from about room temperature to the first temperature of about 250° C. over a period of about no more than 48 hours.

4. The method of claim 1, wherein the carbonizing further comprises the steps of:
    increasing the temperature of the IL rayon fibers from about room temperature to a first temperature of about 250° C.;
    increasing the temperature of the IL rayon fibers from the first temperature to a second temperature between 1000° C. and 1200° C.;
    wherein the temperature of the IL rayon fibers is increased from the first temperature to the second temperature between 1000° C. and 1200° C. over a period of about no more than 24 hours.

5. The method of claim 1, wherein the carbonizing further comprises the steps of:
    increasing the temperature of the IL rayon fibers from about room temperature to a first temperature of about 250° C.;
    increasing the temperature of the IL rayon fibers from the first temperature to a second temperature between 1000° C. and 1200° C.; and
    decreasing the temperature of the IL rayon fibers from the second temperature to about room temperature over a period of about 24 hours.

6. The method of claim 1, wherein the IL rayon fibers are positioned flat during carbonization.

7. The method of claim 6, wherein the carbonizing further comprises the steps of:
    increasing the temperature of the IL rayon fibers from about room temperature to a first temperature of about 250° C.;
    increasing the temperature of the IL rayon fibers from the first temperature to a second temperature between 1000° C. and 1200° C.; and
    decreasing the temperature of the IL rayon fibers from the second temperature to about room temperature over a period of about 24 hours;
    wherein the temperature of the IL rayon fibers is increased from about room temperature to the first temperature of about 250° C. over a period of about no more than 48 hours; and
    wherein the temperature of the IL rayon fibers is increased from the first temperature to the second temperature between 1000° C. and 1200° C. over a period of about no more than 24 hours.

8. The method of claim 1, further comprising the step of washing the carbonized IL rayon fibers using purified water.

9. The method of claim 1, wherein the mixing continues until all of the cellulose is dissolved in the ionic fluid.

10. The method of claim 1, wherein the mixing and degassing are performed at temperatures below 105° C.

11. The method of claim 1, wherein the spinning is performed at a temperature of at least 35° C.

12. The method of claim 11, wherein the spinning is performed at a temperature of about 50° C.

13. The method of claim 1, wherein the concentration of cellulose in the admixture is between 2.4% and 8% w/v.

14. The method of claim 1, wherein the ionic liquid comprises 1-ethyl 3-methylimidazolium acetate.

15. The method of claim 14, wherein the 1-ethyl 3-methylimidazolium acetate has a purity of at least 90%.

16. The method of claim 1, wherein the mixing is performed in an ionic liquid comprising 20% w/v acetone.

17. The method of claim 1, wherein the mixing is performed in an ionic liquid comprising 20% w/v methanol.

18. The method of claim 1, wherein the degassing is performed under vacuum.

19. The method of claim 1, wherein the spinning occurs in a coagulant bath comprising methanol.

20. The method of claim 19, wherein the IL rayon fiber produced by the spinning remains in the coagulant bath for at least one minute.

21. The method of claim 1, wherein washing the IL rayon fibers comprises washing the IL rayon fibers in water until substantially all of the IL is removed.

22. The method of claim 1, wherein the cellulose comprises cotton linters with a degree of polymerization of at least 1000.

23. The method of claim 1, wherein the mixed cellulose comprises bleached wood pulp with a degree of polymerization of at least 1000.

* * * * *